(12) United States Patent
Morrison et al.

(10) Patent No.: US 6,580,545 B2
(45) Date of Patent: Jun. 17, 2003

(54) ELECTROCHROMIC-NANOPARTICLE DISPLAYS

(75) Inventors: Ian D. Morrison, Acton, MA (US); Joseph M. Jacobson, Newton Centre, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 09/683,035

(22) Filed: Nov. 12, 2001

(65) Prior Publication Data

US 2002/0154382 A1 Oct. 24, 2002

Related U.S. Application Data

(60) Provisional application No. 60/284,912, filed on Apr. 19, 2001.

(51) Int. Cl.$^7$ .................................................. G02F 1/15
(52) U.S. Cl. ........................ 359/265; 359/267; 359/273
(58) Field of Search .................................. 359/265–275

(56) References Cited

U.S. PATENT DOCUMENTS 6,301,038 B1 * 10/2001 Fitzmaurice et al. ........ 252/582

FOREIGN PATENT DOCUMENTS

| EP | 1 024 394 A1 | 8/2000 |
|---|---|---|
| GB | 2 306 229 A | 4/1997 |
| JP | 03-123322 A | 5/1991 |
| JP | 10-161161 A | 6/1998 |
| WO | WO 99/53371 | 10/1999 |
| WO | WO 99/53373 | 10/1999 |
| WO | WO 99/59101 | 11/1999 |
| WO | WO 99/67678 | 12/1999 |
| WO | WO 00/03291 | 1/2000 |
| WO | WO 00/03349 | 1/2000 |
| WO | WO 00/05704 | 2/2000 |
| WO | WO 00/20922 | 4/2000 |
| WO | WO 00/36560 | 6/2000 |
| WO | WO 00/36666 | 6/2000 |
| WO | WO 00/38000 | 6/2000 |
| WO | WO 00/38001 | 6/2000 |
| WO | WO 00/67110 | 11/2000 |
| WO | WO 00/67327 | 11/2000 |
| WO | WO 01/07961 | 2/2001 |
| WO | WO 01/08241 | 2/2001 |
| WO | WO 01/17029 | 3/2001 |
| WO | WO 01/17041 | 3/2001 |
| WO | WO 01/27690 | 4/2001 |

OTHER PUBLICATIONS

Wang et al, "Electromic Nanocrystal Quantum Dots," Science Magazine, vol. 291, Mar. 23, 2001, pp. 2390–2392.*

Qian, X., et al., "Surface photovoltage spectra and photo-electrochemical properties . . . ", Thin Solid Films 385, 152–161 (2001).

(List continued on next page.)

*Primary Examiner*—Evelyn Lester
(74) *Attorney, Agent, or Firm*—David J. Cole (57) ABSTRACT

A display comprises spaced first and second electrodes, and a plurality of electrochromic nanoparticles disposed between the electrodes, each of the nanoparticles having an electron-rich state and an electron-depleted state, the two states differing in at least one optical characteristic. Upon injection of charge from one of the electrodes, the nanoparticles switch between their electron-rich and electron-depleted states, thus changing an optical characteristic of the display.

25 Claims, 2 Drawing Sheets

OTHER PUBLICATIONS

Hagfeldt, A., et al., "Electrochromic switching with nanocrystalline TiO2 semiconductor films . . . ", Electrochem Soc. Proc., 95, 143–153 (1995).

Bonhote, P., et al., "Novel electrochromic devices based on complementary nanocrystalline TiO2 and WO3 thin films", Thin Solid Films 350, 269–275 (1999).

Amundson, K., et al., "Flexible, Active–Matrix Display Constructed Using a Microencapsulated Electrophoretic Material and an Organic–Semiconductor–Based Backplane", SID 01 Digest, 160 (Jun. 2001).

Bach, U., et al., "Nanomaterials–Based Electrochromics for Paper–Quality Displays", Adv. Mater, 14(11), 845 (2002).

Bawendi, M.G., "Nanocrystalites; Building Blocks for Quantum Dot Heterostructures", Solid State Comm., 107(11), 709(1998).

Bohnke et al., "Polymer–Based Solid Electrochromic Cell for Matrix–Addressable Display Devices." J. Electrochem. Soc., 138, 3612 (1991).

Chen, Y., et al., "A Conformable Electronic Ink Display using a Foil–Based a–Si TFT Array", SID 01 Digest, 157 (Jun. 2001).

Comiskey, B., et al., "An electrophoretic ink for all–printed reflective electronic displays", Nature, 394, 253 (1998).

Comiskey, B., et al., "Electrophoretic Ink: A Printable Display Material", SID 97 Digest (1997), p. 75.

Dabbousi, B.O., et al., "Electroluminescence from CdSe quantum–dot/polymer composites", Appl. Phys. Lett., 66, 1316 (1995).

Drzaic, P., et al., "A Printed and Rollable Bistable Electronic Display", SID 98 Digest (1998), p. 1131.

Egashira,. N., et al., "Solid electrochromic cell consisting of Lu–diphthalocyanine and lead fluoride", Proceedings of the SID, 28, 227 (1987).

Eighanian, R., et al., "Selective Colorimetric Detection of Polynucleotides Based on the Distance–Dependent Optical Properties of Gold Nanoparticles", Science, 277, 1078 (1997).

Goodman, L.A., Passive Liquid Displays: Liquid Crystals, Electrophoretics and Electrochromics, Proceedings of S.I.D., 17, 30 (1976).

Graetzel, M., "Ultrafast colour displays", Nature, 2001, 409, 575.

Hicks, J.F., et al., "The Dynamics of Electron Self–Exchange between Nanoparticles", J. Am. Chem. Soc., 2001, 123, 7048.

Huang, J., et al., "Photoluminescence and electroluminescence of ZnS:Cu nanocrystals in polymeric networks", Appl. Phys. Lett., 70, 2335 (1997).

Jacobson, J., et al., "The last book", IBM Systems J., 36, 457 (1997).

Jo, G–R., et al., "Toner Display Based on Particle Movements", Chem. Mater., 14, 664 (2002).

Kagan, C.R., et al., "Electronic Energy Transfer in CdSe Quantum Dot Solids", Phys. Rev. Lett, 76(9), 1517–1520 (1996).

Kazlas, P., et al., "12.1" SVGA Microencapsulated Electrophoretic Active Matrix Display for Information Applicances, SID 01 Digest, 152 (Jun. 2001).

Matsumoto, H., et al., "Size Dependent Fluorescence Quenching of CdS Nanocrystals Caused by TiO2 Colloids as a Potential–Variable Quencher", Langmuir, 11, 4283–4287 (1995).

Murray, C.B., et al., "Synthesis and Characterization of Nearly Monodisperse CdE (E=S, Se, Te) Semiconductor Nanocrystallites", J. Am. Chem. Soc., 115(19), 8709 (1993).

National Science and Technology Council, Interagency Working Group on Nanoscience, Engineering and Technology, "Nanotechnology: Research Directions: IWGN Workshop Report", Sep. 1999 (also available at http://itri.loyola.edu/IWGN.Research.Directions).

National Science and Technology Council, Interagency Working Group on Nanoscience, Engineering and Technology, "Nanotechnology: Science and Technology: A Worldwide Study", Sep. 1999—also available at http://itri.loyola.edu/nano/IWGN.Worldwide.Study/nano.pdf).

National Science and Technology Council, Interagency Working Group on Nanoscience, Engineering and Technology, "Nanotechnology: Shaping the World Atom by Atom", Sep. 1999.

Sapp, S.A., et al., "High Contrast Ratio and Fast–Switching Dual Polymer Electrochromic Devices", Chem. Mater., 1998, 10, 2101.

Thornton, N.B., et al., "Chromophore–quencher probes for DNA", New J. Chem., 20, 791–800 (1996).

Tian, J., et al., "Electroluminescent properties of self–assembled polymer thin films", Adv. Mater. 1995, 7, 395–398.

Wang, C., et al., "Electrochromic Nanocrystal Quantum Dots", Science, 2001, 291, 2390–2392.

Yang, W–H, et al., "Discrete dipole approximation for calculating extinction and Raman intensities for small particles with arbitrary shapes", J. Chem. Phys. 103, 869 (1995).

Zhang, J. G., et al., "Chromic mechanism in amorphous WO3 films", J. Electrochem. Soc., 1997, 144(6), 2022.

Zum Felde, U, et al., J. Phys. Chem. B 2000, 104, 9388.

* cited by examiner

ELECTROCHROMIC-NANOPARTICLE DISPLAYS

CROSS REFERENCE TO RELATED APPLICATIONS

This application claims priority from Provisional Application Serial No. 60/284,912 filed Apr. 19, 2001.

REFERENCED-APPLICATIONS

This application is also related to: (1) application Ser. No. 09/565,417, filed May 5, 2000 (now U.S. Pat. No. 6,323,989); (2) application Ser. No. 10/054,721, of even date herewith, a continuation-in-part of the aforementioned application Ser. No. 09/565,417; and (3) Application Serial No. 60/350,735, of even date herewith by Pullen et al., entitled "Nanoparticle Assemblies".

BACKGROUND OF INVENTION

The present invention relates to a display which uses electrochromic nanoparticles.

Electrophoretic displays have been the subject of intense research and development for a number of years. Such displays use a display medium comprising a plurality of electrically charged particles suspended in a fluid. Electrodes are provided adjacent the display medium so that the charged particles can be moved through the fluid by applying an electric field to the medium. In one type of such electrophoretic display, the medium comprises a single type of particle having one optical characteristic in a fluid which has a different optical characteristic. In a second type of such electrophoretic display, the medium contains two different types of particles differing in at least one optical characteristic and in electrophoretic mobility; the particles may or may not bear charges of opposite polarity. The optical characteristic which is varied is typically color visible to the human eye, but may, alternatively or in addition, be any one of more of reflectivity, retroreflectivity, luminescence, fluorescence, phosphorescence or (in the case of displays intended for machine reading) color in the broader sense of meaning a difference in absorption or reflectance at non-visible wavelengths.

Electrophoretic displays can be divided into two main types, namely unencapsulated and encapsulated displays. In an unencapsulated electrophoretic display, the electrophoretic medium is present as a bulk liquid, typically in the form of a flat film of the liquid present between two parallel, spaced electrodes. Such unencapsulated displays typically have problems with their long-term image quality which have prevented their widespread usage. For example, particles that make up such electrophoretic displays tend to cluster and settle, resulting in inadequate service-life for these displays.

An encapsulated, electrophoretic display differs from an unencapsulated display in that the particle-containing fluid is not present as a bulk liquid but instead is confined within the walls of a large number of small capsules. Encapsulated displays typically do not suffer from the clustering and settling failure mode of traditional electrophoretic devices and provides further advantages, such as the ability to print or coat the display on a wide variety of flexible and rigid substrates.

For further details regarding encapsulated electrophoretic displays, the reader is referred to U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,721; 6,252,564; 6,262,706; and 6,262,833, and International Applications Publication Nos. WO 97/04398; WO 98/03896; WO 98/19208; WO 98/41898; WO 98/41899; WO 99/10769; WO 99/10768; WO 99/10767; WO 99/53373; WO 99/56171; WO 99/59101; WO 99/47970; WO 00/03349; WO 00/03291; WO 99/67678; WO 00/05704; WO 99/53371; WO 00/20921; WO 00/20922; WO 00/20923; WO 00/36465; WO 00/38000; WO 00/38001; WO 00/36560; WO 00/20922; WO 00/36666; WO 00/59625; WO 00/67110; WO 00/67327; WO 01/02899; WO 01/07961; WO 01/08241; WO 01/08242; WO 01/17029; WO 01/17040; and WO 01/17041. The entire disclosures of all these patents and published applications, all of which are in the name of, or assigned to, the Massachusetts Institute of Technology or E Ink Corporation, are herein incorporated by reference.

Prior art electrophoretic displays use particles, which, while small (typically about 0.25 to 2 $\mu$m), are sufficiently large that they have essentially the bulk properties of the material from which they are formed. The particles keep the same optical properties during the time they are present in the electrophoretic display; the appearance of the display is changed by moving the particles within the suspending fluid using an appropriate electrical field.

Nanoparticles have diameters from about 1 to about 100 nanometers. Particles in this size range do not generally scatter incident light efficiently unless they are concentrated. The aforementioned U.S. Pat. No. 6,323,989 describes nanoparticle-based reflective displays where the display varies from transparent or translucent to opaque depending on whether the nanoparticles are dispersed or aggregated.

Displays are also known based upon electroluminescent materials. Such materials emit light after being excited by the passage of electric current through the materials. The passage of the electric current raises electrons within the electroluminescent material to excited states, from which the electrons return to their ground states with emission of radiation. Accordingly, electroluminescent displays are emissive and emit light only for so long as the current is passed. This behavior is in contrast to the electrophoretic and nanoparticle-based displays previously described which, because they rely only upon the movement or aggregation of particles are bistable in that once the display has been driven to a desired state, that state will persist for a substantial period without further supply of energy to the display, i.e., such electrophoretic and nanoparticle-based displays are passive, in contrast to the emissive electroluminescent displays.

Electrochromic displays are also well known. Electrochromic materials are those whose color changes with oxidation state, that is by addition of electrons to, or withdrawal of electrons from, molecular orbitals. Note that, in contrast to electroluminescent materials, the optical characteristics of electrochromic materials remain constant so long as the oxidation state of the materials remains the same, so that a display based upon electrochromic materials is passive, and once the display has been driven to a desired state, that state will persist for a substantial period without further supply of energy to the display.

Two types of electrochromic display are common, namely metal-oxide electrochromic displays and molecular electrochromic displays. Electrochromic metal oxides change optical properties in response to the injection of electron charge (anodic) or the withdrawal of electron charge (cathodic); see, for example, Zum Felde, U., et al., *J. Phys. Chem. B* 2000, 104, 9388. Various models have been formulated to explain the electrochromic mechanism. Electrochromic displays consist of up to seven layers of materials, and rely upon transport of hydrogen or lithium ions from an ion storage layer, through an ion-conducting layer, and injection of these ions into an electrochromic layer. The electrochromic layer is typically tungsten oxide ($WO_3$). The presence of the ions in the electrochromic layer changes its optical properties, causing it to absorb visible light. The large-scale result is that the display darkens. The ion-conducting, ion storage and electrochromic layers are sandwiched between two layers of a transparent conducting oxide material. To protect these five layers, they are further sandwiched between two layers of glass. All of the layers, of course, are transparent to visible light. Zhang, J. G., et al., "Chromic mechanism in amorphous $WO_3$ films", *J. Electrochem. Soc.*, 1997, 144(6), 2022; and www.schottdonnelly.com. Such metal-oxide electrochromic displays are relatively slow because of the time for ion diffusion.

Molecular electrochromic materials change optical properties in response to the injection of electron charge (reduction) or the withdrawal of electron charge (oxidation); see, for example, Tian, J., et al., "Electroluminescent properties of self-assembled polymer thin films", *Adv. Mater.* 7995, 7, 395–398;

"Electron rich electrically conducting, redox electroactive, and electrochromic polymers are especially interesting due to their stability in the conducting state and ability to be repeatedly switched between charged and neutral states many times with large changes in properties (such as color). The Reynolds Research Group is developing a family of derivatized poly(3,4-alkylenedioxythiophene)s (PXDOTs) which provide a number of outstanding properties. As electrochromic polymers, these materials switch from a dark opaque blue in their reduced form to a highly transmissive light blue in their oxidized form. We synthesize these polymers with a combination of transition metal mediated solution and electrochemical polymerizations. The polymer's properties are varied by changing either the nature of the pendant group or the size of the alkylenedioxy ring. We find the PXDOTs to exhibit quite high electrochromic contrast ratios as desired in switchable mirror, window, display, and other devices. They also switch quite rapidly with nearly complete color changes being attained in 0.25 to 0.5 seconds. The more highly substituted polymers exhibit the largest electrochromic contrasts and response times".

One advantage of electrochromic polymers over metal oxides is their higher speed. The polymers are usually coated directly on to an electrode. One disadvantage of electrochromic polymers is that optical densities tend to be lower than those of electrochromic metal oxide.

It is also known that certain nanoparticles are electrochromic; see Wang, C., et al., "Electrochromic nanocrystal quantum dots", *Science*, 2001, 291, 2390–2392. This paper states that the optical properties of semiconducting cadmium selenide nanoparticles are changed by reduction of the nanoparticles at an electrode. Subsequent oxidation returned the particles to their original optical state. The injection of electrons into the quantum-confined states of the nanoparticle led to three electrochromic responses: the creation of a size-dependent mid-infrared absorption, a bleaching of the visible absorption, and a quenching of the luminescence. The bleaching of the visible absorption and the quenching of the luminescence changed the color of the particle. If the bleaching and quenching are sufficiently complete, the particle is transparent in the visible.

The present inventors have realized that it is possible to construct displays using electrochromic nanoparticles and that such displays offer substantial advantages over the prior art electrochromic displays described above.

SUMMARY OF INVENTION

Accordingly, in one aspect, this invention provides a display comprising first and second electrodes spaced from one another; and a plurality of electrochromic nanoparticles disposed between the first and second electrodes, each of the nanoparticles having an electron-rich state and an electron-depleted state, the two states differing in at least one optical characteristic, such that injection of charge from at least one of the first and second electrodes will cause at least some of the nanoparticles to switch between their electron-rich and electron-depleted states.

The terms "electron-rich" and "electron-depleted" used herein to refer to the states of the nanoparticles do not require that both states be electrically charged, provided that the states differ in at least one optical characteristic and that the nanoparticles can change from one state to the other by transfer of one or more electrons. One of the states may be electrically neutral and the other electrically charged. For example, the electron-depleted state might be electrically neutral and the electron-rich state negatively charged. Alternatively, the electron-depleted state might be positively charged and the electron-rich state electrically neutral.

In another aspect, this invention provides a method for operating a display, this method comprising providing first and second electrodes spaced from one another; providing a plurality of electrochromic nanoparticles disposed between the first and second electrodes, each of the nanoparticles having an electron-rich state and an electron-depleted state, the two states differing in at least one optical characteristic; and injecting charge from at least one of the first and second electrodes into the nanoparticles, and thereby causing at least some of the nanoparticles to switch between their electron-rich and electron-depleted states, thus changing an optical characteristic of the display.

BRIEF DESCRIPTION OF DRAWINGS

These drawings are not to scale, emphasis instead generally being placed upon illustrating the principles of the invention.

DETAILED DESCRIPTION

As already mentioned, the display of the present invention comprises first and second electrodes and a plurality of electrochromic nanoparticles disposed between these electrodes. Each of the nanoparticles has an electron-rich state and an electron-depleted state, and these two states differ in at least one optical characteristic; this optical characteristic can be any of those previously mentioned, and need not imply a difference between the two states in color visible to the human eye, although this is the most common optical characteristic. Injection of charge from at least one of the electrodes causes at least some of the nanoparticles to switch between their electron-rich and electron-depleted states, thus bringing about a change in the optical characteristic of the display.

Typically, the first and second electrodes of the present display will be in the form of parallel plates, at least one of which is substantially transparent, but it is not essential that the electrodes have this form. For example, to provide one pixel of a display, two electrodes could be disposed side-by-side in the same plane, so that when a potential difference is applied between the two electrodes, the lines of force of the resultant electric field will have the form of arcs extending between the two electrodes. In such an arrangement, a transparent window, which does not need to be electrically conductive, could be provided on the opposed side of the electrochromic nanoparticles from the two electrodes to act as a viewing surface through which an observer views the display. Alternatively, one of the electrodes could be movable, for example in the form of a stylus or similar device, which is moved, manually or mechanically, relative to the other to bring about changes in optical characteristics of the areas over which the movable electrode passes. The electrodes used in the present displays may of course use any known technology for application of electric potentials to displays; for example, the present displays may have a single common first electrode and an array of second electrodes each associated with one transistor of a transistor array such as those used to drive active matrix liquid crystal displays.

In a preferred form of the invention, described below with reference to FIGS. 1A and 1B, at least one of the first and second electrodes comprises a layer of an electrically conductive metal or metal oxide, for example tin dioxide. Desirably, this electrode also comprises a semiconductive layer, which may be formed from titanium dioxide.

The electrochromic nanoparticles used in the present displays are nanoparticles whose optical spectra or fluorescent spectra change when a positive electric charge (oxidation) or negative electric charge (reduction) is injected into the nanoparticle. The present invention changes the color of the display by adding electric charge to the particles (oxidation or reduction) rather than just changing the inter-particle distance or particle position; cf. the aforementioned Wang paper and Mulvaney, P., "Artificial solids based on gold colloid core-shell particles", Particles 2001, Orlando, paper 194. More specifically, it is the addition of electrons to, or withdrawal of electrons from, the molecular orbitals of the electrochromic nanoparticles (i.e., the reduction or oxidation of the nanoparticles) which changes the optical characteristics of the display. Typically, the major changes in optical characteristics are quenching of fluorescence (discussed in more detail below) and bleaching of optical absorption in the visible light range. One important advantage of the present displays over prior art electrochromic displays based upon electrochromic molecules is that oxidized or reduced electrochromic nanoparticles are much more resistant to molecular rearrangements and chemical reactions than oxidized or reduced electrochromic molecules, and hence the present displays should have longer operating lifetimes than prior art displays, which have often had problems in this regard.

Although the upper limit on size will vary somewhat depending upon the material used to form the nanoparticles, typically the majority of the nanoparticles used in the present displays will have diameters in the range of about 1 to about 100 nm, preferably about 5 to about 50 nm. The term "diameter" is used herein to include what is usually known as the "equivalent diameter" of a non-spherical particle, i.e., the diameter of a sphere which has the same volume as the non-spherical particle. Electrochromic nanoparticles are normally formed from semiconductors, for example cadmium selenide (CdSe) or indium phosphide (InP). Nanoparticles made from semiconductive materials act like electrochromic molecules because the nanoparticles have distinct electron orbits. In such nanoparticles, the energy gap between the highest occupied molecular orbital (HOMO) and the lowest unoccupied molecular orbital (LUMO) is dependent upon the size of the nanoparticle, and this HOMO-LUMO gap also varies with the oxidation state of the nanoparticle. Since the color of the nanoparticles depends upon the size of the HOMO-LUMO gap, the variation in the size of this gap with oxidation state renders the nanoparticles electrochromic. Furthermore, the variation of the HOMO-LUMO gap with the size of the nanoparticles permits variation in the electrochromic colors by variation of the size and shape of the nanoparticles, thus permitting "tuning" of the present displays to a desired color by appropriate choice of nanoparticles. In general, the smaller the nanoparticles, the shorter the wavelength of the color, i.e., going to smaller nanoparticles shifts the color to the blue.

The electrochromic nanoparticle displays of the present invention can also provide gray scale. The number of nanoparticles that have been oxidized or reduced determines the color change in an electrochromic nanoparticle layer, so that controlling the total number of charges that are injected controls the degree of color change. Such control may be effected by varying the time for which the electric field is applied. Alternatively, each pixel may be addressed through a capacitor; charging the capacitor quickly to a known voltage would introduce a known number of electric charges per unit area to the nanoparticle array, and thus achieve a previously-determined gray state. One of the advantages of the displays of the present invention, as compared with prior art molecular electrochromic materials is that the present displays can make more "efficient" use of a given electric charge. Typically, in the present displays, addition or removal of one electron brings about a color change over a whole nanoparticle, which might have a diameter of (say) 30 nm. In contrast, addition or removal of one electron in a molecular electrochromic material only brings about a color change in one molecule of the material, which covers an area substantially smaller than that of a nanoparticle. Accordingly, typically the displays of the present invention will require less charge injection to bring about a given color change over a given area than do displays based upon prior art molecular electrochromic materials.

Semiconducting nanoparticles fluoresce when illuminated with short wavelength radiation (ultra-violet or shorter radiation), that is they emit light of a longer wavelength than the illuminating radiation. This fluorescence is quenched when the nanoparticles are reduced, and this oxidation state dependent quenching can be used to produce additional changes in the optical characteristics of the display.

Normally, in the displays of the present invention, a non-electrochromic matrix material will be provided between the electrodes and surrounding the electrochromic nanoparticles. The matrix material may facilitate charge injection into the electrochromic nanoparticles and/or assist in the injection of countercharges adjacent the nanoparticles. The matrix material may be liquid, solid or semi-solid. When the matrix material is a liquid, the electrochromic nanoparticles may move electrophoretically through the liquid to one of the electrodes where charge injection or removal takes place to effect the change in optical characteristic of the nanoparticles. Alternatively, the dispersion of electrochromic nanoparticles in the liquid matrix material could contain oxidizing or reducing agents to act as charge carriers from the electrodes to the nanoparticles; cf. Shim, M., et al., *Nature,* 2000, 409, 981.

When the matrix material is a solid or semi-solid, it may be a porous solid, a dry powder, a sintered dry powder, a polymer or a gel. Obviously, in most solid matrix materials, the electrochromic nanoparticles will be immobile. Charge injection into the nanoparticles may be effected by charges hopping from particle to particle, or by flowing through the matrix; note that the amounts of charge which are needed to bring about changes in optical characteristics in the present displays are so small that many matrix materials normally regarded as insulators have sufficient electrical conductivity to permit the necessary current flow through the matrix material. However, in general it is preferred that solid matrix materials either themselves be chosen to facilitate charge injection or that they contain additives for this purpose. The properties of the solid matrix material are important since one limiting factor on the speed at which the optical characteristics of the nanoparticles can be changed is the speed at which countercharges can be provided adjacent the electrochromic nanoparticles. For example, a solid matrix material may contain one or more mobile oxidizing or reducing species able to carry charge to or away from the electrochromic nanoparticles. Alternatively, the solid matrix material may comprise one or more hole or electron conducting materials; the types of materials used for the same purposes in electrophotography may be used, as described in the aforementioned Shim et al. paper. The hole or electron conducting material may be polymeric (for example, polyvinylcarbazole may be used, or a polythiophene or phthalocyanine) and form part or all of a polymeric solid matrix material. Alternatively, the solid matrix material may comprise a non-polymeric hole or electron conducting material, for example a triarylamine, dispersed in a polymeric matrix, which typically will not itself be hole or electron-conducting. Providing a hole or electron-conducting layer between the nanoparticle and the electrode substantially increases the lifetime of the charge on the nanoparticle, and allows the entire conduction path to be electronic, not ionic.

The charge-carrying entity within the matrix material may be chemically or physically bonded to one of the electrodes, to a nanoparticle, or to both. For example, a polymeric hole or electron conducting material could be chemically bonded at its opposed ends to one of the electrodes and to a nanoparticle to facilitate charge injection into the nanoparticle.

It will be appreciated that dispersing nanoparticles in a solid matrix material so that the nanoparticles are immobile in effect "dilutes" the nanoparticles in that only the nanoparticles, and not the matrix material, undergo the color change; if carried too far, this dilution of the nanoparticles restricts the optical density (or similar quantitative measure of an optical characteristic) which can be achieved with a given thickness of nanoparticle-containing layer. Typically, when the nanoparticle are dispersed in a solid (or semi-solid) binder, the nanoparticles will comprise from about 1 to about 99 percent by volume of the total volume of nanoparticles and matrix material, and preferably about 5 to about 75 percent by volume of the total volume of nanoparticles and matrix material.

As will readily be apparent to those skilled in optics, when nanoparticles are dispersed in a matrix material, light may be scattered from the interfaces between the nanoparticles and the matrix material, and the amount of such scattering is dependent upon the difference in refractive index between the nanoparticles and the matrix material. Such scattering is undesirable in that it tends to reduce the contrast between the various states of the display, and also tends to render a transparent state of the nanoparticle-containing layer (see further below) less transparent. Accordingly, when constructing a display of the present invention, attention should be paid to the relative refractive indices of the nanoparticles and the matrix material.

Instead of being dispersed in a solid matrix material, the electrochromic nanoparticles may be attached to one of the electrodes, either directly or via a molecular "tether", with the former arrangement generally being preferred. Obviously, attachment of the nanoparticles to an electrode, either directly or via a conductive tether, ensures ready flow of electrons into or out of the nanoparticle. The electrode may be made porous or rough to provide a large surface area to which the nanoparticles may be attached.

As already indicated, the optical change in many electrochromic nanoparticles is from a strong visible absorption in the electron-depleted state to a substantially transparent electron-rich state; more accurately, the visible absorption band in the electron-depleted state becomes a non-visible absorption in the electron-rich state so that the visible absorption essentially disappears and the nanoparticles appear transparent to the eye. A display of the present invention using this type of nanoparticle and substantially transparent first and second electrodes can act as a light valve, or a variable color filter. Furthermore, because one of the states of the nanoparticles is transparent, such a display of the present invention functioning as a light valve or shutter could be used in conjunction with any known type of electro-optic medium to increase the number of display states which can be obtained from each pixel of the electro-optic medium. Consider, for example, a simple monochrome electro-optic medium having a viewing surface displaying a plurality of pixels each of which can only be black or white. If this monochrome medium is overlaid with a display of the present invention having red and transparent states, and with pixels aligned with those of the monochrome medium, each pixel of the resulting medium will have three possible states (red, white and black), and may be used, for example, to provide a black-on-white (or white-on-black) text display with the capability for red highlighting of particular text.

In a preferred form of such a display, the electro-optic medium comprises at least one additional electrochromic nanoparticle layer, i.e., the complete display comprises two separate, stacked electrochromic nanoparticle-containing layers. Thus, in addition to the first and second electrodes and the plurality of electrochromic nanoparticles, a display of the present invention may comprise a third electrode spaced from the second electrode and a plurality of second electrochromic nanoparticles disposed between the second and third electrodes, each of the second nanoparticles having an electron-rich state and an electron-depleted state, the two states differing in at least one optical characteristic, such that injection of charge from at least one of the second and third electrodes will cause at least some of the second nanoparticles to switch between their electron-rich and electron-depleted states, the second nanoparticles having a non-transparent state differing in optical characteristic from the non-transparent state of the nanoparticles between the first and second electrodes. In a especially preferred form, the present display further comprises a fourth electrode spaced from the third electrode and a plurality of third electrochromic nanoparticles disposed between the third and fourth electrodes, each of the third nanoparticles having an electron-rich state and an electron-depleted state, the two states differing in at least one optical characteristic, such that injection of charge from at least one of the third and fourth electrodes will cause at least some of the third nanoparticles to switch between their electron-rich and electron-depleted states, the third nanoparticles having a non-transparent state differing in optical characteristic from the non-transparent state of both the second nanoparticles and the nanoparticles between the first and second electrodes. Such a stacked, three-layer display could, if all three electrochromic nanoparticle-containing layers have transparent states, function as a transmissive full-color display. Alternatively, if the nanoparticle-containing layer furthest from the viewing surface has two different colored states, or if a reflective surface is placed on the side of the display remote from the viewing surface, the resultant display can display four colors at each pixel. A display of this type is described below with reference to FIG. 2.

It is not essential that all of the electrochromic nanoparticles used in a display of the present invention be of the same type. Indeed, interesting color change effects may be provided by using combinations of nanoparticles of similar composition but differing sizes, or by using combinations of nanoparticles of differing composition. If nanoparticles of differing composition are present in the same nanoparticle-containing layer, they will typically "switch" (i.e., undergo their change in optical characteristic) at differing voltages, and hence by varying the voltage applied and/or amount of charge injected into the system, a series of differing colors can be produced at each pixel of the display.

The displays of the present invention may make use of other methods for changing optical characteristics in addition to changes in the electrochromic nanoparticles. For example, a display of the present invention may make use of both electrochromic color changes and color changes due to changes in the aggregation of the nanoparticles, as described in the aforementioned U.S. Pat. No. 6,323,989. It will readily be apparent that the type of display previously described, in which electrochromic nanoparticles are free to move electrophoretically through a liquid matrix material, could make use of both types of color changes. Also, a single display could make use of changes in optical characteristics due both to nanoparticles and to larger particles, for example the electrophoretic movement of the larger particles.

Preferred embodiment of the invention will now be described, though by way of illustration only, with reference to the accompanying drawings.

Figure 1A:
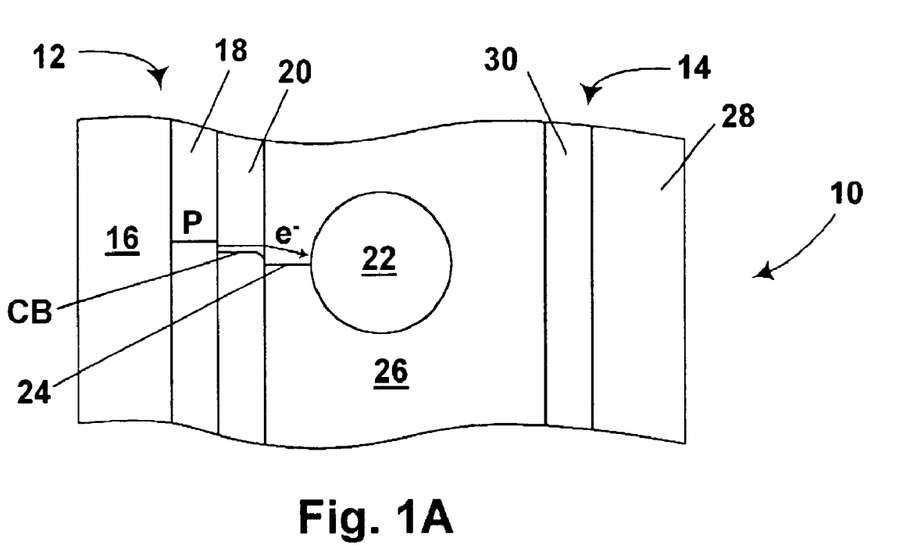
FIGS. 1A and 1B of the accompanying drawings are highly schematic end elevations of a preferred electrochromic display of the present invention.
Figure 1B:
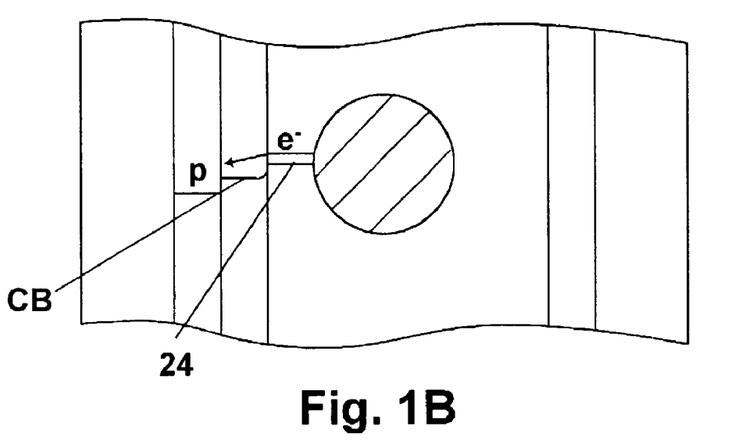

The first preferred display of the invention, generally designated 10, shown in FIGS. 1A and 1B, comprises a first electrode 12 and a second electrode 14; for ease of illustration, the thickness of these electrodes is exaggerated relative to the spacing between them. The first electrode 12 comprises a substrate 16 in the form of a polymeric film, a conductive layer 18 formed of tin dioxide. and a semiconductive layer 20 formed of titanium dioxide. A plurality of nanoparticles 22 (only one is shown in FIGS. 1A and 1B), formed of cadmium selenide, are attached to the electrode 12, as indicated at 24. Reference numeral 24 indicates a path for passage of electrons between the semiconductive layer 20 and the nanoparticles 22 and may have the form of a chemical bond or an electrically conductive tether connecting the two. The nanoparticles 22 are surrounded by a layer of a hole transporting material 26, which extends to the second electrode 14. This second electrode itself comprises a substrate 28 in the form of a polymeric film and a conductive layer 30 formed of tin dioxide.

FIG. 1A shows the display 10 with the nanoparticle 22 in its electron-rich state and hence substantially uncolored. To bring the nanoparticle 22 to this state, the conductive layer 18 is brought to a high negative potential, as indicated symbolically at P (note that since FIGS. 1A and 1B are concerned solely with the movement of negative electrons, it is convenient to represent electric potentials using a sign convention opposite to that normally employed). The potential P is higher than that of the conduction band (designated CB) of electrons within the semiconductive layer 20, so that an electron flows from the conductive layer 18 through the conduction band characterized by and via the bond 24 into the nanoparticle 22, thus bringing the nanoparticle to its electron-rich, uncolored state.

To bring about a transition of the nanoparticle 22 to its electron-depleted, colored state, the conductive layer 18 is brought to a smaller negative potential p, which lies below that of the conduction band CB and that of the nanoparticle 22 itself. Accordingly, as shown in FIG. 1B, an electron flows from the nanoparticle 22 via the bond 24 into the conduction band CB and thence into the conductive layer 18, thus causing the nanoparticle 22 to assume its electron-depleted, colored state.

Figure 2:
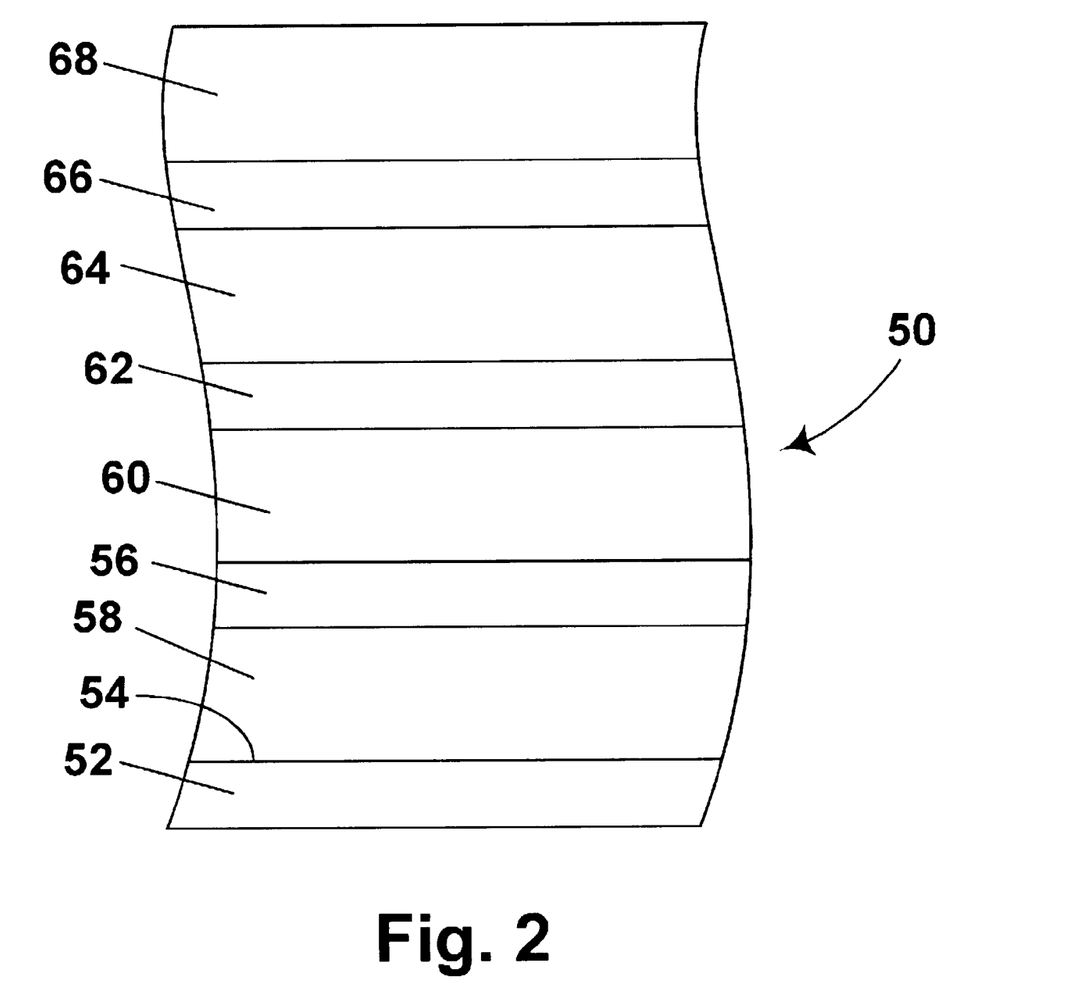
FIG. 2 is a schematic end elevation of a second, multilayer display of the present invention.

FIG. 2 shows, in a highly schematic manner, a single pixel of a color display (generally designated 50) of the invention in which each pixel is capable of displaying at least four colors. The display 50 comprises a first electrode 52 provided with a surface 54 having a first color (assumed for present purposes to be white), a substantially transparent second electrode 56 and a first nanoparticle layer 58 disposed between the first and second electrodes and comprising nanoparticles dispersed in a solid hole transporting material. The nanoparticle layer is switchable, in the same manner as described with reference to FIG. 1 above, between a substantially transparent electron-rich state and an electron-depleted state which has a second color different from the first color of the surface 54 and assumed for present purposes to be red. On the opposed side of the second electrode 56 from the first nanoparticle layer 58 is a second nanoparticle layer 60, which is similar to the first nanoparticle layer 58 in that it comprises nanoparticles dispersed in a solid hole transporting material; however, the second nanoparticle layer 60 is switchable between a substantially transparent electron-rich state and an electron-depleted state which has a third color different from both the aforementioned first and second colors and assumed for present purposes to be green. The display 50 further comprises a substantially transparent third electrode 62, disposed on the opposed side of the second nanoparticle layer 60 from the second electrode 56 and a third nanoparticle layer 64 on the opposed side of the electrode 62 from the second nanoparticle layer 58. The third nanoparticle layer 64 is similar to the first and second nanoparticle layers 58 and 60 in that it comprises nanoparticles dispersed in a solid hole transporting material; however, the third nanoparticle layer 64 is switchable between a substantially transparent electron-rich state and an electron-depleted state which has a fourth color different from all the aforementioned first, second and third colors and assumed for present purposes to be blue. Finally, the display 50 comprises a substantially transparent fourth electrode 66, which is common to all the pixels of the display and which is carried on a transparent substrate 68, which acts as a protective layer for the display and also forms a viewing surface through which an observer views the display 50.

The display 50 is provided with voltage supply means (not shown) which permit the potentials of the first, second and third electrodes to be varied independently relative to the potential of the fourth electrode, which is conveniently held at ground potential.

Each pixel of the display 50 has four different color states, as follows:

(a) blue state, in which the third nanoparticle layer 64 is in its electron-depleted blue state, while the first and second nanoparticle layers are in their transparent states;

(b) a green state, in which the third nanoparticle layer 64 is in its electron-rich, substantially transparent state, the second nanoparticle layer 60 is in its electron-depleted green state, and the first nanoparticle layer is in its transparent state;

(c) a red state, in which the second and third nanoparticle layers 60 and 64 are in their electron-rich, substantially transparent states, and the first nanoparticle layer 58 is in its electron-depleted red state; and (d) a white state, in which all three nanoparticle layers 58, 60 and 64 are in their electron-rich, substantially transparent states and an observer sees the white color of the surface 54.

Since the nanoparticle layers are capable of achieving multiple gray scale levels, as previously discussed, combinations of various colors are possible. Alternatively, the nanoparticle layers could be modified so that, when in their electron-depleted states, they display yellow, cyan and magenta colors respectively, while permitting the complementary colors to pass through. This arrangement may have advantages in achieving good color control, and also allows for the formation of a black pixel by driving the yellow, cyan and magenta colors to their maximum densities simultaneously. Such a display could also be modified by eliminating the white surface 54 and making the first electrode 52 transparent, so that the display could be used in transmission.

Preferred displays of the present invention can achieve a number of important advantages. As already mentioned, because of the efficient use of electrons in the present displays (because each electron typically causes the optical change over the whole area of a nanoparticle) the displays require little charge injection and are highly energy efficient, especially since the displays are stable once driven to the desired state. The present displays can operate at low voltages, typically around 1–3 Volts, and thus at lower voltages than prior art electrophoretic displays, which normally require at least 10 Volts. The present displays can be made thin and flexible; the nanoparticle-containing layer itself need only be of the order of a few times the nanoparticle diameter and may thus have a thickness of from about 50 nm up to of the order of 1 $\mu$m, while the electrodes, which may comprise simply a layer of conductive material on a flexible substrate, typically a polymeric film, need only be thick enough to provide mechanical integrity to the display.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A display comprising:

first and second electrodes spaced from one another;

a plurality of electrochromic nanoparticles disposed between the first and second electrodes, each of the nanoparticles having an electron-rich state and an electron-depleted state, the two states differing in at least one optical characteristic, such that injection of charge from at least one of the first and second electrodes will cause at least some of the nanoparticles to switch between their electron-rich and electron-depleted states; and a solid non-electrochromic matrix material disposed between the electrodes and surrounding the nanoparticles.

2. A display according to claim 1 wherein at least some of the nanoparticles comprise a semiconductor.

3. A display according to claim 2 wherein the semiconductor comprises cadmium selenide or indium phosphide.

4. A display according to claim 1 wherein the majority of the nanoparticles have diameters in the range of about 1 to about 100 nm.

5. A display according to claim 4 wherein the majority of the nanoparticles have diameters in the range of about 5 to about 50 nm.

6. A display according to claim 1 wherein the solid matrix material is selected from the group consisting of porous solids, dry powders, sintered dry powders, polymers and gels.

7. A display according to claim 1 wherein the solid matrix material comprises at least one mobile oxidizing or reducing species able to carry charge to or away from he nanoparticles.

8. A display according to claim 1 wherein the solid matrix material comprises at least one hole or electron conducting material.

9. A display according to claim 8 wherein the hole or electron conducting material is polymeric.

10. A display according to claim 9 wherein the hole or electron conducting material comprises poly (vinylcarbazdle).

11. A display according to claim 8 wherein the solid matrix material comprises a non-polymeric hole or electron conducting material dispersed in a polymeric matrix.

12. A display according to claim 11 wherein the solid matrix material comprises a triarylamine dispersed in a polymer which does not itself conduct holes or electrons.

13. A display according to claim 1 wherein the nanoparticles comprise from about 1 to about 99 percent by volume of the total volume of the nanoparticles and the matrix.

14. A display according to claim 1 wherein the nanoparticles comprise from about 5 to about 75 percent by volume of the total volume of the nanoparticles and the matrix.

15. A display according to claim 1 wherein a charge carrying entity able to supply an electron to, or remove an electron from, one of the nanoparticles is bonded to one of the nanoparticles.

16. A display according to claim 1 wherein a charge carrying entity able to supply an electron to, or remove an electron from, one of the nanoparticles is bonded to one of the first and second electrodes.

17. A display according to claim 1 wherein one of the states of the nanoparticles is substantially transparent to visible radiation and the other of the states is not substantially transparent to visible radiation, and the first and second electrodes are also substantially transparent to visible radiation, so that the display acts as a light gate.

18. A display according to claim 1 wherein at least one of the first and second electrodes comprises a layer of an electrically conductive metal or metal oxide.

19. A display according to claim 18 wherein, in addition to the electrically conductive layer, said one electrode comprises a semiconductive layer.

20. A display according to claim 19 wherein the nanoparticles are bonded to the semiconductive layer.

21. A display according to claim 19 wherein the semiconductive layer comprises titanium dioxide.

22. A display according to claim 20 wherein the solid matrix comprises a hole transporting material.

23. A display comprising:

first and second electrodes spaced from one another;

a plurality of electrochromic nanoparticles disposed between the first and second electrodes, each of the nanoparticles having an electron-rich state and an electron-depleted state, the two states differing in at least one optical characteristic, such that injection of charge from at least one of the first and second electrodes will cause at least some of the nanoparticles to switch between their electron-rich and electron-depleted states;

one of the states of the nanoparticles being substantially transparent to visible radiation and the other of the states not being substantially transparent to visible radiation, the first and second electrodes also being substantially transparent to visible radiation, so that the display acts as a light gate; and a third electrode spaced from the second electrode and a plurality of second electrochromic nanoparticles disposed between the second and third electrodes, each of the second nanoparticles having an electron-rich state and an electron-depleted state, the two states differing in at least one optical characteristic, such that injection of charge from at least one of the second and third electrodes will cause at least some of the second nanoparticles to switch between their electron-rich and electron-depleted states, the second nanoparticles having a non-transparent state differing in optical characteristic from the non-transparent state of the nanoparticles between the first a second electrodes.

24. A display according to claim 23 wherein the second nanoparticles have a state which is substantially transparent to visible radiation, the display further comprising a fourth electrode spaced from the third electrode and a plurality of third electrochromic nanoparticles disposed between the third and fourth electrodes, each of the third nanoparticles having an electron-rich state and an electron-depleted state, the two states differing in at least one optical characteristic, such that injection of charge from at least one of the third and fourth electrodes will cause at least some of the third nanoparticles to switch between their electron-rich and electron-depleted states, the third nanoparticles having a non-transparent state differing in optical characteristic from the non-transparent state of both the second nanoparticles and the nanoparticles between the first and second electrodes.

25. A method for operating a display, the method comprising:

providing first and second electrodes spaced from one another;

providing a plurality of electrochromic nanoparticles disposed between the first and second electrodes, each of the nanoparticles having an electron-rich state and an electron-depleted state, the two states differing in at least one optical characteristic;

providing a solid non-electrochromic matrix material disposed between the electrodes and surrounding the nanoparticles; and injecting charge from at least one of the first and second electrodes into the nanoparticles, and thereby causing at least some of the nanoparticles to switch between their electron-rich and electron-depleted states, thus changing an optical characteristic of the display.

* * * * *